No. 840,900. PATENTED JAN. 8, 1907.
J. N. BIRSNER.
DRAIN ATTACHMENT FOR MASH TUBS.
APPLICATION FILED SEPT. 1, 1906.
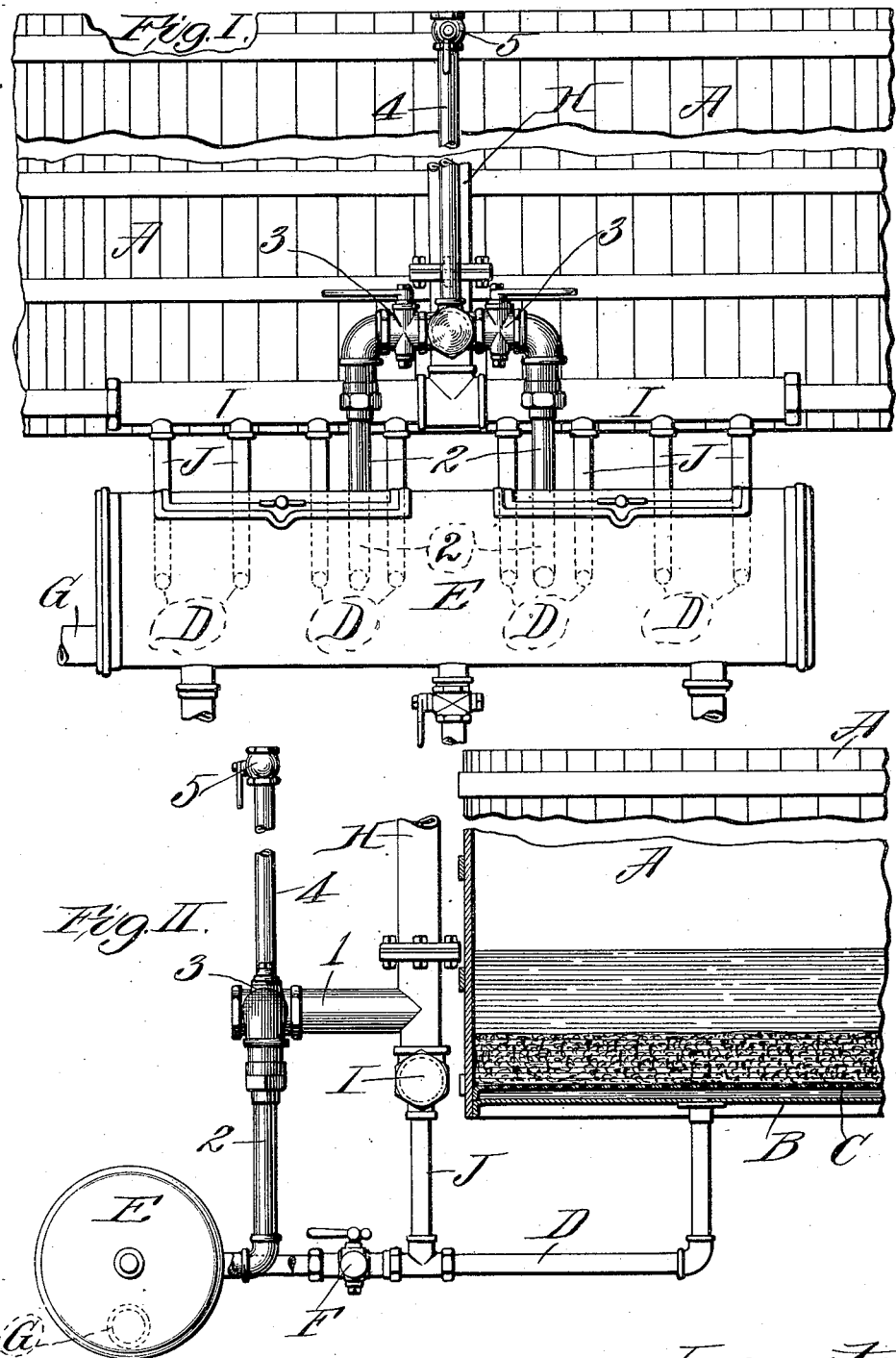

UNITED STATES PATENT OFFICE.

JOHN N. BIRSNER, OF BELLEVILLE, ILLINOIS.

DRAIN ATTACHMENT FOR MASH-TUBS.

No. 840,900.　　　Specification of Letters Patent.　　　Patented Jan. 8, 1907.

Application filed September 1, 1906. Serial No. 332,933.

*To all whom it may concern:*

Be it known that I, JOHN N. BIRSNER, a citizen of the United States of America, residing in Belleville, in the county of St. Clair and State of Illinois, have invented certain new and useful Improvements in Drain Attachments for Mash-Tubs, of which the following is a full, clear, and exact description, reference being had to the accompanying drawings, forming part of this specification.

My invention relates to a drain attachment for mash-tubs, and has for its object to provide in a construction of this character improved means whereby the wort may be effectually and rapidly withdrawn from mash-tubs, this result being accomplished due to prevention of packing of the mash in the mash-tubs.

Mash-tubs as ordinarily constructed include a main bottom and a perforated false bottom located above said main bottom and on which the mash rests, and the drain attachment is commonly connected to the main bottom to receive the wort which descends through the mash and the perforated false bottom beneath it. In using an apparatus of this construction it is difficult to drain the wort from the mash-tube, due to the settling and packing action of the mash upon the false bottom of the tub to such a degree that the wort cannot readily pass therethrough or to such a degree that the perforations in said false bottom become clogged by the mash, thus preventing the downward flow of the wort. By my improvement I cause the wort to flow upwardly to a higher level than the level of the false bottom of the mash-tub after escaping from the bottom of the tub, and thereby reduce the degree of pressure of the wort in the tub upon the mash, with the result that the mash remains in a loose condition, and the wort is permitted to flow readily therethrough.

Figure I is an elevation of a portion of a mash-tub and the usual drain and water-conducting members with my attachment shown connected to said members. Fig. II is in part a side elevation of the drain and water-conducting members with my attachment applied thereto and in part a vertical section of a portion of a mash-tub.

A designates a mash-tub, which may be of any common form and which is provided with the main bottom B and the perforated false bottom C. (See Fig. II.)

D represents a series of drain-pipes leading from the main bottom of the mash-tub to a receiving-tank E and through which the wort from the mash-tub may be conducted to said receiving-tank. Each of the wort-drain pipes D is provided with a valve F. The wort entering into the receiving-tank E is discharged therefrom through the outlet-pipe G, by which it is delivered to a brew-kettle. (Not shown.)

H is a vertical conveying-pipe through which water may be conveyed under pressure to the drain-pipes D to enter the mash-tub for the purpose of initially furnishing a small supply of water in the mash-tub in order that the mash material introduced thereinto may be prevented from descending onto the perforated false bottom of the tub to clog the perforations therein. This pipe H is connected to a header I, located at about the height of the false bottom C, and to which is attached a series of branch pipes J, that lead to the drain-pipes D, thus furnishing communication between the pipes H and D.

No invention *per se* is herein claimed for the parts just described, all of which are known by me to be old.

1 designates the main draw-pipe leading from the vertical conveying-pipe H at a point above the level of the false bottom C of the mash-tub, and 2 represents branch draw-pipes leading from said main draw-pipe to the wort-receiving chamber E, each of these branch pipes being provided with a cut-off valve 3.

In the practical use of the herein-described mash-tub-draining members with my attachment associated therewith the operation is as follows: The valves F of the drain-pipes D are first opened and the wort is discharged from the mash-tub through the drain-pipes D to the receiving-tank E, this flow being continued until the mash runs clear or, in other words, after all particles of grain which may have lodged under the false bottom C and drain-pipes D are removed through the receiving-tank E and then being pumped back into the mash-tub. (Pump not shown.) The valves F of the pipes D are then closed and the valves 3 of my attachment are opened which were previously closed. The flow of the wort is then in a course through the drain-pipes D to the branch pipes J and into the conveying-pipe H after passing into the header I, to which the pipes H and J are connected. As the wort enters the pipe H it flows into the draw-pipe 1 of my attachment, which is, as previously stated, located at a higher level than that occupied by the false bottom of the mash-tub, and from this draw-pipe the wort passes to the receiving-tank E. It will be readily understood that by causing flow of the wort into and through the draw-pipe 1 and therefrom to the receiving-tank the pressure of the wort in the mash-tub upon the mash therein is caused to be less than the pressure of the wort on the mash when the wort is delivered directly to the receiving-tank E through the drain-pipes D, that are located at a lower level than the false bottom in said tub. As a result of this lessening of the pressure by conducting the wort to an elevation greater than that of the false bottom of the mash-tub the packing action upon the mash by the wort is relieved, and therefore the wort may flow readily through said mash and be discharged to the receiving-tank instead of being restrained in the tub by the mass of packed mash.

During the operation of drawing off the wort from the mash-tub there is constantly present in the draw-pipes 1 and 2 an amount of vapor which acts to retard the free flow of the wort from the mash-tub to the receiving-tank E and prevent successful and continued flow of the wort. For the purpose of overcoming this obstacle to the satisfactory operation of my apparatus I apply to the draw-pipe 1 a vertically-extending vent-pipe 4, through which the vapor may readily escape, this vent-pipe being extended above the level of the wort within the mash-tub in order that the wort may not rise therein to a sufficient height to escape through the open upper end of the vent-pipe.

5 is a shut-off valve applied to the vent-pipe and adapted to be closed previous to the passage of water through the conveying-pipe H in order that said water when delivered to the mash-tub under pressure may not escape through the draw-pipe 1 and the vent-pipe.

I claim—

A mash-tub comprising a false bottom, drain-pipes, a header located about the plane of the false bottom, branch pipes connecting the drain-pipes with the header, a pipe for conducting water under pressure to the header, a main draw-pipe connected with the water-pipe adjacent to the header, a receiving-tank, branch pipes having cut-off valves and connecting the main draw-pipe with the receiving-tank, and vertically-extending vent-pipe for vapor, connected with the main draw-pipe and provided with a shut-off valve for closing the vent-pipe previous to the passage of water.

JOHN N. BIRSNER.

In presence of—
  A. W. BEDEL,
  ALEX HILGARD.